US010194490B2

(12) United States Patent
Chamberlain et al.

(10) Patent No.: US 10,194,490 B2
(45) Date of Patent: Jan. 29, 2019

(54) WIRED GLAZING AND A PROCESS FOR MANUFACTURE THEREOF

(71) Applicant: PILKINGTON GROUP LIMITED, Lathom, Nr. Ormskirk, Lancashire (GB)

(72) Inventors: Mark Andrew Chamberlain, Ormskirk (GB); Leigh Francis Mellor, St. Helens (GB)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 54 days.

(21) Appl. No.: 15/510,568

(22) PCT Filed: Sep. 10, 2015

(86) PCT No.: PCT/GB2015/052617
§ 371 (c)(1),
(2) Date: Mar. 10, 2017

(87) PCT Pub. No.: WO2016/038372
PCT Pub. Date: Mar. 17, 2016

(65) Prior Publication Data
US 2017/0291398 A1 Oct. 12, 2017

(30) Foreign Application Priority Data

Sep. 12, 2014 (GB) .................. 1416183.0

(51) Int. Cl.
*H05B 3/84* (2006.01)
*B32B 17/10* (2006.01)
*H05B 3/86* (2006.01)

(52) U.S. Cl.
CPC ......... *H05B 3/84* (2013.01); *B32B 17/10036* (2013.01); *B32B 17/10293* (2013.01);
(Continued)

(58) Field of Classification Search
CPC .................. B32B 17/10559; B32B 17/10568
See application file for complete search history.

(56) References Cited

U.S. PATENT DOCUMENTS 3,440,408 A 4/1969 Brittan
3,833,451 A * 9/1974 Wagner ............. B32B 17/10174
428/67

(Continued)

FOREIGN PATENT DOCUMENTS

EP 0 385 785 A1 9/1990
EP 2 063 685 A1 5/2009
(Continued)

OTHER PUBLICATIONS

International Search Report (PCT/ISA/210) dated Nov. 24, 2015, by the European Patent Office as the International Searching Authority for International Application No. PCT/GB2015/052617.
(Continued)

*Primary Examiner* — Z. Jim Yang
(74) *Attorney, Agent, or Firm* — Buchanan Ingersoll & Rooney PC

(57) ABSTRACT

A wired glazing is disclosed comprising a ply of interlayer material, having a first busbar and an auxiliary busbar and heating wires between them. An adhesive layer is arranged between the first busbar and the ply of interlayer material. An auxiliary adhesive layer is arranged where an edge of the auxiliary busbar extends beyond an edge of the first busbar. The auxiliary adhesive layer bonds the auxiliary busbar to the ply of interlayer material. A corresponding process for manufacturing a wired glazing is disclosed.

19 Claims, 3 Drawing Sheets

(52) U.S. Cl.
CPC .. *B32B 17/10302* (2013.01); *B32B 17/10385* (2013.01); *B32B 17/10559* (2013.01); *B32B 17/10761* (2013.01); *H05B 3/86* (2013.01); *H05B 2203/011* (2013.01); *H05B 2203/014* (2013.01); *H05B 2203/017* (2013.01)

(56) References Cited

U.S. PATENT DOCUMENTS

| | | | |
|---|---|---|---|
| 3,947,837 A | 3/1976 | Bitterice | |
| 4,128,448 A | 12/1978 | Bitterice et al. | |
| 4,902,879 A * | 2/1990 | Walters | B32B 17/10018 219/203 |
| 5,307,076 A * | 4/1994 | Murakami | B32B 17/10036 343/704 |
| 6,396,026 B2 | 5/2002 | Gillner et al. | |
| 2002/0005398 A1 | 1/2002 | Gillner et al. | |
| 2003/0227663 A1* | 12/2003 | Agrawal | B32B 17/10036 359/265 |
| 2004/0016739 A1* | 1/2004 | Hawk | H05B 3/84 219/203 |
| 2005/0045700 A1* | 3/2005 | Winter | B23K 35/02 228/246 |
| 2008/0268672 A1* | 10/2008 | Sargent | H01R 12/57 439/78 |
| 2010/0165436 A1* | 7/2010 | Voss | B32B 17/10 359/238 |
| 2011/0017487 A1* | 1/2011 | Short | H05B 3/84 174/68.2 |
| 2011/0170170 A1* | 7/2011 | Boote | B32B 17/10174 359/296 |
| 2011/0297665 A1* | 12/2011 | Parker | H05B 3/22 219/494 |
| 2012/0167947 A1* | 7/2012 | Battaglia, Jr. | B32B 17/10018 136/246 |
| 2014/0251975 A1* | 9/2014 | Fawcett | H05B 3/86 219/203 |
| 2014/0332518 A1* | 11/2014 | Lesmeister | H05B 3/84 219/202 |
| 2014/0353015 A1* | 12/2014 | Hoepfner | H05K 1/181 174/255 |
| 2015/0116638 A1* | 4/2015 | Zhang | B32B 17/10174 349/86 |
| 2015/0283786 A1* | 10/2015 | Massault | B60J 1/02 428/161 |
| 2015/0343744 A1* | 12/2015 | Ogawa | B32B 17/10761 219/201 |

FOREIGN PATENT DOCUMENTS

| | | | | |
|---|---|---|---|---|
| GB | 972453 A | | 10/1964 | |
| GB | 2228710 A | | 9/1990 | |
| GB | 2511552 A | * | 9/2014 | ............... H05B 3/86 |
| GB | 2528899 A | * | 2/2016 | ....... B32B 17/10036 |
| GB | 2537701 A | * | 10/2016 | ............. H01R 4/027 |
| JP | 2000030847 A1 | | 1/2000 | |
| WO | WO-2008047164 A1 | * | 4/2008 | ....... B32B 17/10036 |
| WO | WO-2013092253 A1 | * | 6/2013 | ............... H05B 3/84 |

OTHER PUBLICATIONS

Written Opinion (PCT/ISA/237) dated Nov. 24, 2015, by the European Patent Office as the International Searching Authority for International Application No. PCT/GB2015/052617.

British Search Report dated Feb. 12, 2015 issued by the British Intellectual Property Office in corresponding British Patent Application No. GB1416183.0 (3 pages).

* cited by examiner

WIRED GLAZING AND A PROCESS FOR MANUFACTURE THEREOF

BACKGROUND OF THE INVENTION

The invention is concerned with a glazing comprising heating wires.

It is well known in the field of automotive windscreens to provide an array of fine, closely spaced heating wires embedded in an interlayer material between two outer plies, usually of glass.

The heating wires extend between and are in electrical contact with two opposing busbars, typically positioned adjacent to upper and lower edges of the glazing.

EP0385785 and EP0385791 disclose a busbar which comprises a narrow metal strip and a wider metal strip, such that the heating wires are arranged between the metal strips. In a process for manufacture, a narrow metal strip is laid over a sheet of interlayer material. A heated iron is run over the narrow metal strip, to melt the interlayer material locally and embed the narrow metal strip in the interlayer material. The interlayer material is placed on a drum and wires are then laid over the interlayer material and pressed into it by a heated presser roller (as disclosed in US2009/0206191). The interlayer material is then laid on a flat table and a wider metal strip is applied over the narrow metal strip so that it extends beyond the narrow metal strip on both edges thereof. A hot iron is then run over the wider metal strip, to bond it to the interlayer material, and to secure the ends of the wires, by trapping them between the metal strips and the interlayer. The interlayer material is then arranged between first and second glass plies and the resulting assembly is heated in an autoclave in known manner. In the autoclave, the interlayer softens so that the heating wires and metal strips become fully embedded in the interlayer and thus securely fixed in position.

To improve an electrical connection between the busbar assembly and the heating wires, the wider metal strip may be provided with a low melting point solder layer on part of a surface in contact with the heating wires. Low melting point solder is defined as solder which melts and fills spaces between the heating wires in an autoclave, i.e. having a melting point not more than 150 degrees C., the maximum autoclave temperature. On solidification, the low melting point solder bonds the heating wires firmly in position and provides a durable electrical connection between the wider metal strip and the heating wires. A similar low melting point solder layer may be applied to the narrow metal strip.

EP1110431 discloses that products manufactured by the process disclosed in EP0385791 have lower in-service failure rates. The improvement is thought to be due to (a) low melting point solder holding the heating wires, so that heating wires do not lose contact with a busbar and (b) low melting point solder filling spaces between heating wires, so that moisture is prevented from entering a busbar assembly and thus a possibility of an electrolytic reaction between dissimilar metals is avoided.

JP2000-030847 discloses a glazing in which adhesion between busbars and heating wires is improved and good conduction maintained over a long period of time by applying a conductive adhesive between the busbars and the heating wires. The conductive adhesive may be a solder layer, an acrylic hardening glue or an epoxy system heat cure glue. At least one busbar is embedded in interlayer material. The glazing has improved performance in a peel test and in a 30 day thermal cycle test.

WO2011023974 discloses a glazing comprising a conductive pathway for heating the glazing and a busbar. A busbar may be glued to a ply of glazing material to obtain a good mechanical interface. A busbar may be coated with low melting point solder or conductive adhesive to provide a good electrical connection to the conductive pathway.

U.S. Pat. No. 6,396,026B2 discloses a glazing comprising a busbar on a thermoplastic layer, the busbar comprising a lower copper foil strip which is fixed to the thermoplastic layer using an adhesive. Heating wires are laid on the lower copper foil strip and an upper copper foil strip is laid on the heating wires. The lower copper foil strip has a previously applied layer of soft solder as a tin coating on the freely accessible side. A soldering operation is performed by applying a soldering iron to the upper copper foil strip.

There remains a need for an alternative glazing, comprising heating wires, having a low in-service failure rate and a corresponding process for manufacture, avoiding at least one process step needing a heated iron, would be desirable.

STATEMENT OF INVENTION

According to the present invention from a first aspect, a glazing is provided comprising the features set out in claim 1 attached hereto.

The inventors have found that an adhesive layer, bonding the first busbar to the ply of interlayer material, and an auxiliary adhesive layer, arranged where an edge of an auxiliary busbar extends beyond an edge of the first busbar, bonding the auxiliary busbar to the ply of interlayer material, provides positional control of the first busbar and auxiliary busbar and eliminates "solder splash" faults in the glazing.

"Solder splash" faults occur during process steps using a heated iron, in two types: "low melting point solder splash" and "tin splash".

Firstly, "low melting point solder splash" faults occur because the low melting point solder layer flows beyond the edges of the first busbar. Surprisingly, bonding the first busbar to the sheet of interlayer material by an adhesive layer provides sufficient positional control of the first busbar, which is maintained during a process step in which a heated iron melts the solder layer to fix in position the ends of heating wires and the auxiliary busbar. Thus a process step, in which a heated iron is run over the first busbar, to melt the interlayer material locally and embed the first busbar in the interlayer material, is avoided. Surprisingly, the adhesive layer is without detrimental effect regarding process yield or in-service failure rate of the glazing.

Secondly, "tin splash" faults occur because a tin layer flows beyond the edges of the first busbar. The tin layer is used in the prior art to prevent oxidation of copper and so to enable easier application of a low melting point solder layer. A typical heated iron temperature is higher than the melting point of tin (232 degrees C.), hence "tin splash" faults occur due to the tin layer. In a preferred embodiment of the invention, all surfaces of each busbar are covered with a low melting point solder layer by passing each busbar through a bath of low melting point solder. Before entering the bath each busbar is clean, i.e. has not suffered oxidation, so a tin layer is not needed. Thus the invention eliminates "tin splash" faults.

Preferably, a distance between the edge of the auxiliary busbar and the edge of the first busbar is in a range 2 mm to 5 mm.

Preferably, the first busbar has a width in a range 2 mm to 8 mm, more preferably 3 mm to 6 mm, most preferably 4 mm to 5 mm.

Preferably, the auxiliary busbar has a width in a range 4 mm to 12 mm, more preferably 6 mm to 10 mm, most preferably 8 mm to 9 mm.

Preferably, the first busbar is of metal, more preferably copper, of thickness in a range 50 um to 200 um, most preferably 90 um to 100 um.

Preferably, the low melting point solder layer covers substantially all of a surface of the first busbar in contact with the heating wire, or of the auxiliary busbar in contact with the heating wire and a solder layer thickness is in a range 1 um to 50 um, more preferably 5 um to 20 um.

Preferably, the low melting point solder layer covers both a surface of the first busbar in contact with the heating wire and an opposite surface of the first busbar or the low melting point solder layer covers both a surface of the auxiliary busbar in contact with the heating wire and an opposite surface of the auxiliary busbar.

Preferably, the low melting point solder layer melting point is in a range 120 degrees C. to 150 degrees C., more preferably 120 degrees C. to 140 degrees C.

Preferably, the adhesive layer has thickness in a range 10 um to 100 um, more preferably 20 um to 50 um.

Preferably, an array of heating wires extends between, and is in electrical contact with, first and second busbars for supplying electrical power to the array of heating wires.

Preferably, the ply of interlayer material is arranged between first and second plies of glazing material.

According to the present invention from a second aspect, a process is provided for manufacture of a glazing, comprising the steps set out in claim 13 attached hereto.

Preferably, the process further comprises the step of arranging an auxiliary adhesive layer where an edge of the auxiliary busbar extends beyond an edge of the first busbar, for bonding the auxiliary busbar to the ply of interlayer material.

Preferably, the process further comprises the step of positioning the edge of the auxiliary busbar and the edge of the first busbar such that the distance between them is in a range 2 mm to 5 mm.

Advantageously, due to the adhesive layer arranged between the first busbar and the ply of interlayer material, process steps of embedding the first busbar and the auxiliary busbar in the ply of interlayer material using a heated iron are not required. The inventors have found that these prior art process steps using a heated iron cause the low melting point solder layer to flow beyond the edges of the of the first busbar, resulting in "solder splash" faults and therefore lower process yield. Eliminating these steps has resulted in yield improvement.

The inventors have found that the low melting point solder layer does not flow beyond the edges of the first busbar when heated in an autoclave. This is believed to be due to the low melting point solder being contained by the interlayer material.

In an advantageous embodiment, the process comprises a step of covering all surfaces of at least one busbar with low melting point solder, by feeding the busbar through a bath of low melting point solder. Surprisingly, the inventors have found that the low melting point solder layer adheres directly to the busbar without detrimental effect on in-service performance. So a tin layer is not required, and thus "tin splash" faults, due to tin melting and flowing during a manufacturing process, are avoided. Preferably all surfaces of the first busbar are covered with low melting point solder.

BRIEF DESCRIPTION OF THE DRAWINGS

The invention will now be described by means of non-limiting examples with reference to the attached figures.

DETAILED DESCRIPTION OF THE INVENTION

Although the invention is described herein with particular reference to an automotive windscreen, it will be understood that it has applications to other vehicle glazing, for example a rear window or a side window.

Figure 1:
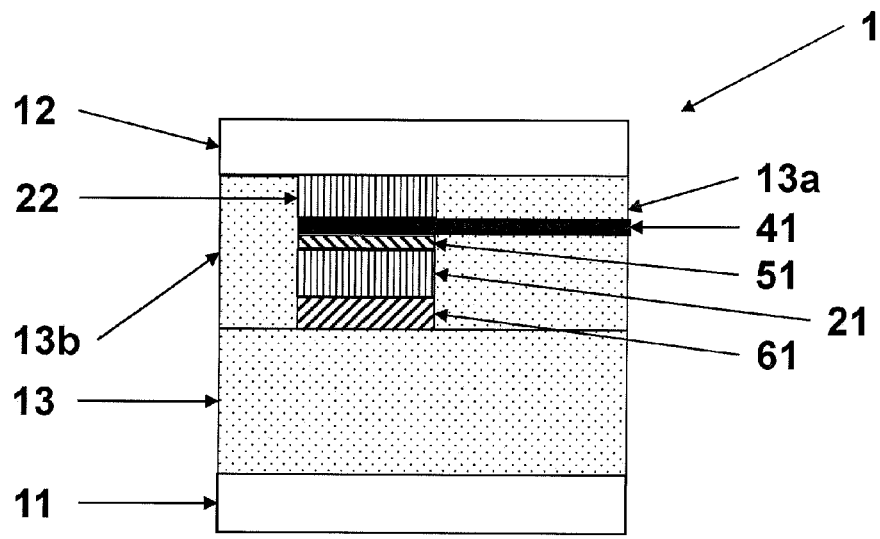
FIG. 1 shows a glazing according to the prior art in cross-section, viewed from an end of a first busbar.

FIG. 1 shows a glazing 1, according to the prior art, wherein a first busbar 21 is laid over the ply of interlayer material 13 and an array of heating wires 41 is laid over the first busbar 21. A low melting point solder layer 51 has been applied on a surface of the first busbar 21 facing the heating wires 41. An auxiliary busbar 22 is laid over the heating wires 41. The interlayer material 13 is arranged on a first ply of glazing material 11, and a second ply of glazing material 12 is laid over the auxiliary busbar 22.

The low melting point solder layer 51 serves two purposes: firstly of improving an electrical connection between the heating wires and the busbars, and secondly of filling the gaps around the heating wires 41, so as to prevent moisture ingress.

Between the first busbar 21 and the ply of interlayer material 13 is an adhesive layer 61. The adhesive layer 61 serves the purpose of providing positional stability of the heating wires 41, which is also achievable by firstly embedding the first busbar in the ply of interlayer material 13 and secondly embedding the heating wires 41 in the ply of interlayer material by means of a heated presser roller on a drum of a wire laying apparatus.

Figure 2:
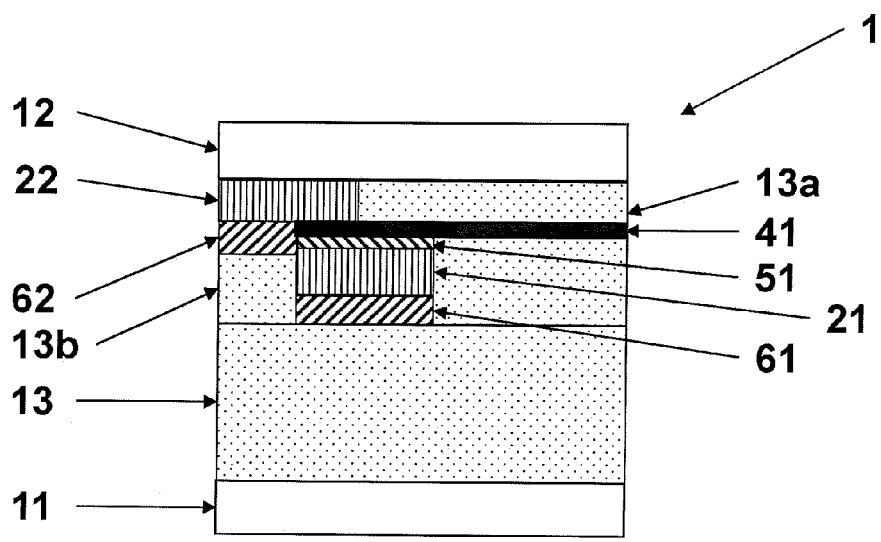
FIG. 2 shows a glazing according to the invention in cross-section, viewed from an end of a first busbar, comprising an auxiliary adhesive layer for bonding an auxiliary busbar to a ply of interlayer material in a region where an edge of the auxiliary busbar extends beyond an edge of the first busbar.

FIG. 2 shows a glazing 1, according to the invention, similar to the glazing 1 of FIG. 1, wherein an auxiliary adhesive layer 62 is arranged where an edge of the auxiliary busbar 22 extends beyond an edge of the first busbar 21. The auxiliary adhesive layer 62 bonds the auxiliary busbar 22 to the ply of interlayer material 13, thus providing additional positional stability to the heating wires 41.

Figure 3:
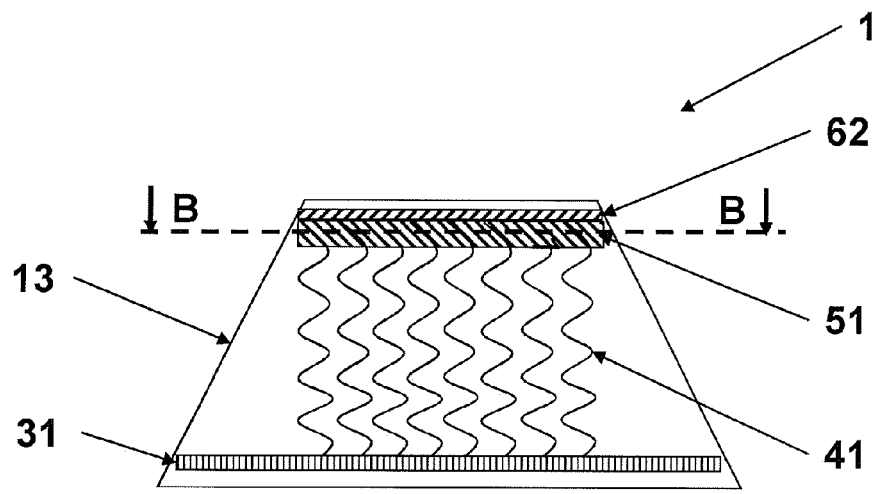
FIG. 3 shows a glazing according to the invention in a plane containing heating wires (line A-A of FIG. 4).

FIG. 3 shows a glazing 1, according to the invention, similar to the glazing 1 of FIG. 2, wherein an auxiliary adhesive layer 62 is arranged where an edge of the auxiliary busbar 22 extends beyond an edge of the first busbar 21. FIG. 3 is a plan view of the plane of the heating wires 41, i.e. line A-A of FIG. 4.

Figure 4:
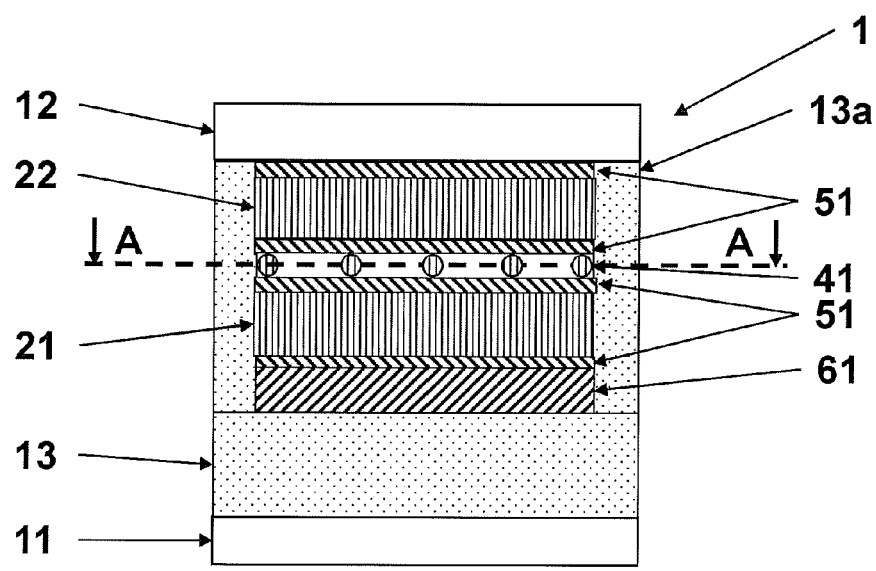
FIG. 4 shows a glazing according to the invention in cross-section, viewed from an end of a heating wire (line B-B of FIG. 3).

FIG. 4 is a cross-section of the glazing 1 of FIG. 3, on line B-B.

Figure 5:
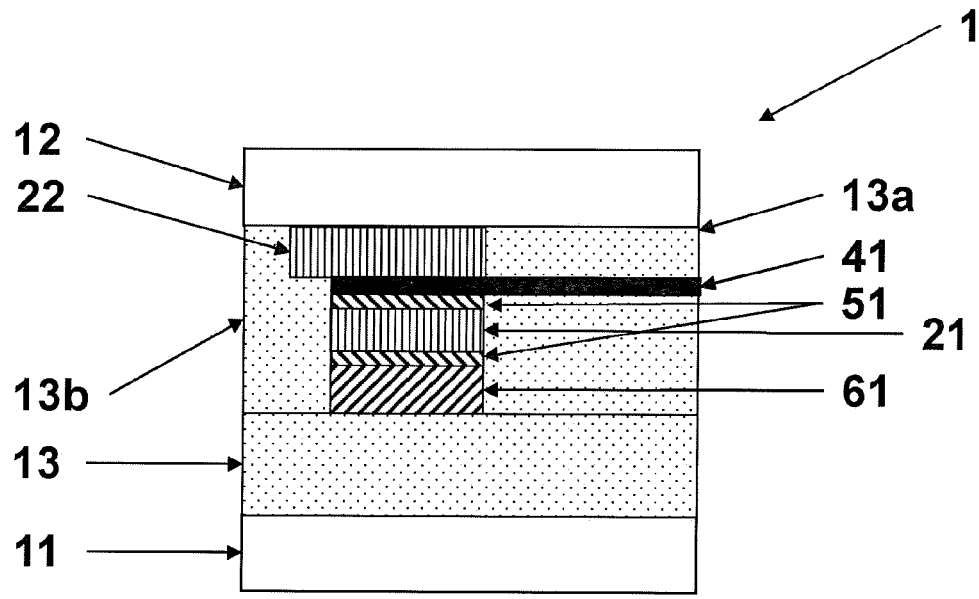
FIG. 5 shows a glazing according to a preferred embodiment of the invention, wherein a first busbar and an auxiliary busbar are coated with low melting point solder on all surfaces of the first busbar.

FIG. 5 is similar to FIG. 1, but the first busbars 21 is provided with a low melting point solder layer 51 on all surfaces.

The low melting point solder layer 51 serves two purposes: firstly of improving electrical contact between the heating wires and the busbars 21, 22, and secondly of filling the gaps around the heating wires 41, so as to prevent moisture ingress.

Optionally an edge of the auxiliary busbar 22 extends beyond an edge of the first busbar 21, so that a heated iron may be used to embed the auxiliary busbar 22 in the interlayer material 13, to fix the auxiliary busbar in position.

Figure 6:
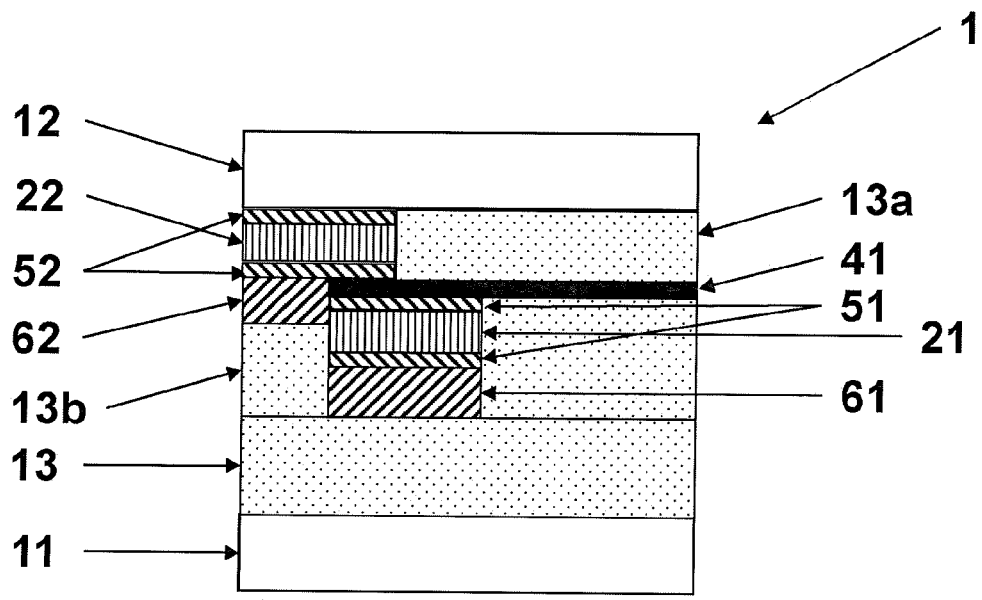
FIG. 6 shows a glazing according to a preferred embodiment of the invention, wherein a first busbar and an auxiliary busbar are coated with low melting point solder on all surfaces and comprising an auxiliary adhesive layer for bonding an auxiliary busbar to a ply of interlayer material in a region where an edge of the auxiliary busbar extends beyond an edge of the first busbar.

FIG. 6 is similar to FIG. 2, but each of the busbars 21, 22 is provided with a low melting point solder layer 51, 52 on all surfaces.

In FIGS. 1, 2, 4, 5 and 6, the ply of interlayer material 13 comprises first and second regions of interlayer material 13a, 13b, which have flowed between the original ply of interlayer material 13 and the second ply of glazing material 12, such that the busbars 21, 22 and heating wires 41 are embedded in the ply of interlayer material 13, 13a, 13b. In FIGS. 2 and 6, the second region of interlayer material 13b is bounded by the auxiliary adhesive layer 62. Because the ply of interlayer material 13 comprises a thermoplastic material it flows under elevated temperature and pressure in an autoclave to form first and second regions of interlayer material 13a, 13b.

EXAMPLES OF THE INVENTION

A glazing was prepared according to the invention in the following process steps. A ply of interlayer material 13, such as polyvinyl butyral (PVB) was provided. The PVB thickness was 0.76 mm. First and second busbars 21, 31 were laid on the ply of interlayer material 13. The busbars comprised copper strip, width 4 mm, thickness 100 um, and a low melting point solder layer 51 substantially covering all of a surface for contacting heating wires 41. The ply of interlayer material 13 was arranged on a drum of a wire laying apparatus known in the art (such as US2009/0206191). Heating wires 41 were laid on the first and second busbars 21, 31, extending between them.

To simplify a process of manufacture of the busbar, the first busbar 21 was also coated with a low melting point solder layer 51 on an opposite surface to the surface for contacting the heating wires 41. The inventors have found that a first busbar 21 or auxiliary busbar 22 having a low melting point solder layer 51 on both surfaces is suitable for use with the invention. Surprisingly, a result is a reduction in "solder splash" faults compared with the prior art, in which a narrow strip of low melting point solder is applied to a busbar on a surface for contact the heating wires only.

An adhesive layer 61 was arranged between the first busbar 21 and the ply of interlayer material 13, to bond them together.

An auxiliary busbar 22 was laid on the array of heating wires 41. An auxiliary adhesive layer 62 was arranged where an edge of the auxiliary busbar 22 extended beyond an edge of the first busbar 21.

The ply of interlayer material 13 was laid on a ply of glazing material 11. The glazing material was soda-lime silicate float glass. A second ply of glazing material 12 was laid on the auxiliary busbar 22, forming a completed assembly. The completed assembly was pressed at its edges and then de-gassed in a manner known in the art. The assembly was introduced to an autoclave and heated under pressure in a manner known in the art.

The resultant product was first tested by visual inspection and no "solder splash" faults was observed. The product was further tested using a Salt Spray Test according to International Standard ISO 9227 (similar to DIN 50021, now discontinued). Salt water was sprayed in to a chamber in which the glazing had been placed. Electrical power was supplied to the heating wires 41 via first and second busbars 21, 31 for a period; then electrical power was switched off for a period. The test was repeated over approximately seven weeks. The glazing was observed using a thermal imaging camera. No loss of function due to corrosion by the salt water was observed.

The invention claimed is:

1. A glazing, comprising:
a ply of interlayer material;
a first busbar laid over the ply of interlayer material;
an adhesive layer between the first busbar and the ply of interlayer material, the adhesive layer bonding together the first busbar and the ply of interlayer material;
at least one heating wire laid over the first busbar;
an auxiliary busbar at least partly laid over the heating wire and at least partly laid over the first busbar;
and an auxiliary adhesive layer arranged where an edge of the auxiliary busbar extends beyond an edge of the first busbar;
wherein a solder layer suitable for melting in an autoclave covers at least part of a surface of the first busbar or the auxiliary busbar and is arranged to contact the heating wire;
wherein the auxiliary adhesive layer bonds the auxiliary busbar to the ply of interlayer material; and
wherein the solder layer covers both a surface of the first busbar in contact with the heating wire and an opposite surface of the first busbar, or wherein the solder layer covers both a surface of the auxiliary busbar in contact with the heating wire and anopposite surface of the auxiliary busbar.

2. The glazing according to claim 1, wherein a distance between the edge of the auxiliary busbar and the edge of the first busbar is in a range 2 mm to 5 mm.

3. The glazing according to claim 1, wherein the first busbar has a width in a range 2 mm to 8 mm.

4. The glazing according to claim 1, wherein the auxiliary busbar has a width in a range 4 mm to 12 mm.

5. The glazing according to claim 1, wherein the first busbar is of metal of thickness in a range 50 um to 200 um.

6. The glazing according to claim 1, wherein the solder layer covers substantially all of a surface of the first busbar in contact with the heating wire or wherein the solder layer covers substantially all of a surface of the auxiliary busbar in contact with the heating wire.

7. The glazing according to claim 1, wherein the solder layer has thickness in a range 1 um to 50 um.

8. The glazing according to claim 1, wherein the solder layer melting point is in a range 120 degrees C. to 150 degrees C.

9. The glazing according to claim 1, wherein the adhesive layer has thickness in a range 10 um to 100 um.

10. The glazing according to claim 1, wherein an array of heating wires extends between, and is in electrical contact with, first and second busbars for supplying electrical power to the array of heating wires.

11. The glazing according to claim 1, wherein the ply of interlayer material is arranged between first and second plies of glazing material.

12. The glazing according to claim 1, wherein the first busbar has a width in a range 4 mm to 5 mm.

13. The glazing according to claim 1, wherein the auxiliary busbar has a width in a range 8 mm to 9 mm.

14. The glazing according to claim 1, wherein the first busbar is made of copper with a thickness in a range 90 um to 100 um.

15. The glazing according to claim 1, wherein the solder layer has thickness in a range 5 um to 20 um.

16. The glazing according to claim 1, wherein the solder layer melting point is in a range 125 degrees C. to 135 degrees C.

17. The glazing according to claim 1, wherein the adhesive layer has thickness in a range 20 um to 50 um.

18. A process for manufacture of a glazing, comprising:
providing a ply of interlayer material;
laying a first busbar over the a ply of interlayer material;
arranging an adhesive layer between the first busbar and the ply of interlayer material to bond together the first busbar and the ply of interlayer material;
laying at least one heating wire over the first busbar;
laying an auxiliary busbar at least partly over the heating wire and at least partly over the first busbar;
arranging an auxiliary adhesive layer where an edge of the auxiliary busbar extends beyond an edge of the first busbar;
laying a solder layer on at least part of a surface of the first busbar or the auxiliary busbar and arranging the solder layer to contact the heating wire;
arranging an adhesive layer between the first busbar and the ply of interlayer material for bonding them together;
arranging an auxiliary adhesive layer where an edge of the auxiliary busbar extends beyond an edge of the first busbar for bonding the auxiliary busbar to the ply of interlayer material by the auxiliary adhesive layer; and
wherein the solder layer covers both a surface of the first busbar in contact with the heating wire and an opposite surface of the first busbar or wherein the solder layer covers both a surface of the auxiliary busbar in contact with the heating wire and an opposite surface of the auxiliary busbar.

19. The process for manufacture of a glazing according to claim 18, comprising positioning the edge of the auxiliary busbar and the edge of the first busbar such that the distance between them is in a range 2 mm to 5 mm.

* * * * *